United States Patent
Adams

(10) Patent No.: US 7,023,487 B1
(45) Date of Patent: Apr. 4, 2006

(54) DEINTERLACING OF VIDEO SOURCES VIA IMAGE FEATURE EDGE DETECTION

(75) Inventor: Dale R. Adams, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 578 days.

(21) Appl. No.: 10/057,823

(22) Filed: Jan. 25, 2002

(51) Int. Cl.
*H04N 7/01* (2006.01)
*H04N 11/20* (2006.01)

(52) U.S. Cl. ............... 348/448; 348/452; 348/458; 348/625; 348/630; 382/263; 382/266

(58) Field of Classification Search ......... 348/441, 348/448, 452, 458, 625, 630, 700, 701; 382/260–266; H04N 7/01, 11/20
See application file for complete search history.

(56) References Cited

U.S. PATENT DOCUMENTS

| | | | |
|---|---|---|---|
| 5,488,421 A * | 1/1996 | Hwang et al. ............... 348/448 |
| 5,519,451 A * | 5/1996 | Clatanoff et al. ........... 348/606 |
| 5,532,751 A | 7/1996 | Lui |
| 5,592,231 A * | 1/1997 | Clatanoff et al. ........... 348/452 |
| 5,638,139 A | 6/1997 | Clatanoff et al. |
| 5,784,115 A | 7/1998 | Bozdagi |
| 5,864,369 A | 1/1999 | Swan |
| 5,936,676 A * | 8/1999 | Ledinh et al. .............. 348/452 |
| 6,055,018 A | 4/2000 | Swan |
| 6,104,755 A | 8/2000 | Chara |
| 6,118,488 A * | 9/2000 | Huang ........................ 348/452 |
| 6,133,957 A | 10/2000 | Campbell |
| 6,166,772 A | 12/2000 | Voltz |
| 6,181,382 B1 * | 1/2001 | Kieu et al. .................. 348/459 |
| 6,269,484 B1 | 7/2001 | Simsic |
| 6,396,543 B1 * | 5/2002 | Shin et al. .................. 348/452 |
| 6,421,090 B1 * | 7/2002 | Jiang et al. ................. 348/452 |

(Continued)

*Primary Examiner*—Brian P. Yenke
(74) *Attorney, Agent, or Firm*—Perkins Coie LLP

(57) ABSTRACT

An interlaced to progressive scan video converter which identifies object edges and directions, and calculates new pixel values based on the edge information. Source image data from a single video field is analyzed to detect object edges and the orientation of those edges. A 2-dimensional array of image elements surrounding each pixel location in the field is high-pass filtered along a number of different rotational vectors, and a null or minimum in the set of filtered data indicates a candidate object edge as well as the direction of that edge. A 2-dimensional array of edge candidates surrounding each pixel location is characterized to invalidate false edges by determining the number of similar and dissimilar edge orientations in the array, and then disqualifying locations which have too many dissimilar or too few similar surrounding edge candidates. The surviving edge candidates are then passed through multiple low-pass and smoothing filters to remove edge detection irregularities and spurious detections, yielding a final edge detection value for each source image pixel location. For pixel locations with a valid edge detection, new pixel data for the progressive output image is calculated by interpolating from source image pixels which are located along the detected edge orientation.

13 Claims, 13 Drawing Sheets

U.S. PATENT DOCUMENTS

| | | |
|---|---|---|
| 6,489,998 B1 | 12/2002 | Thompson et al. |
| 6,504,577 B1 | 1/2003 | Voltz et al. |
| 6,577,345 B1 * | 6/2003 | Lim et al. .................. 348/452 |
| 6,614,484 B1 * | 9/2003 | Lim et al. .................. 348/448 |
| 6,630,961 B1 * | 10/2003 | Shin et al. .................. 348/448 |
| 6,731,342 B1 * | 5/2004 | Shin et al. .................. 348/452 |
| 6,847,405 B1 | 1/2005 | Hsu et al. |
| 6,867,814 B1 | 3/2005 | Adams et al. |
| 6,909,469 B1 | 6/2005 | Adams |
| 2002/0027610 A1 * | 3/2002 | Jiang et al. .................. 348/448 |
| 2002/0047919 A1 * | 4/2002 | Kondo et al. .................. 348/441 |
| 2002/0093587 A1 * | 7/2002 | Michel .................. 348/452 |

* cited by examiner

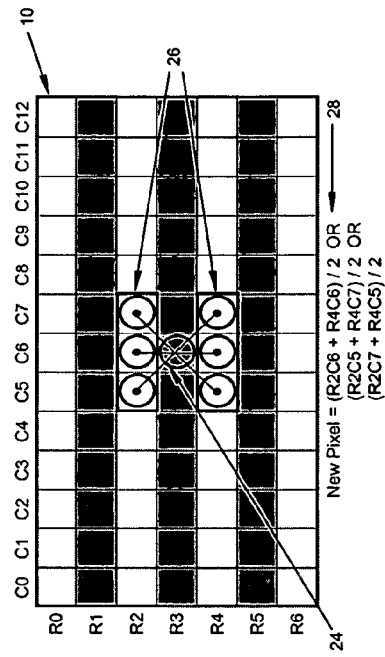
Figure 1c: Simple diagonal detection/interpolation
"PRIOR ART"
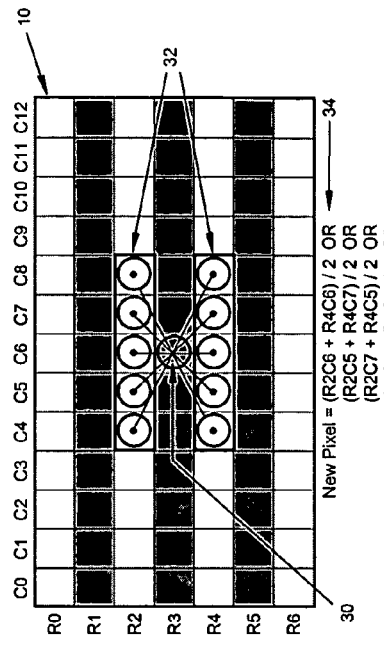
Figure 1d: Pair-wise difference magnitude edge detection and interpolation
"PRIOR ART"
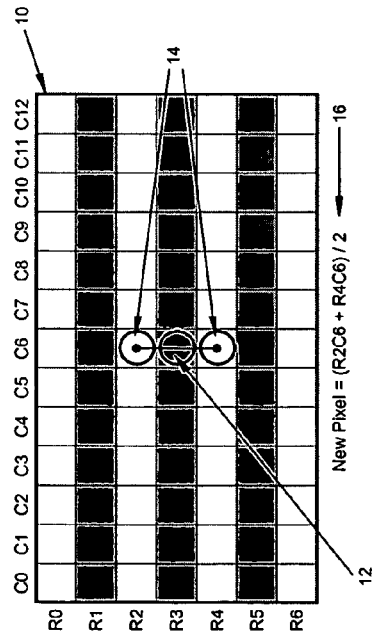
Figure 1a: 2-point linear interpolation
"PRIOR ART"
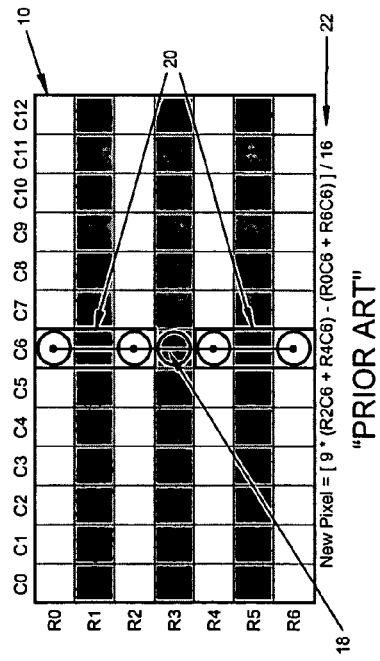
Figure 1b: Cubic polynomial curve fit
"PRIOR ART"

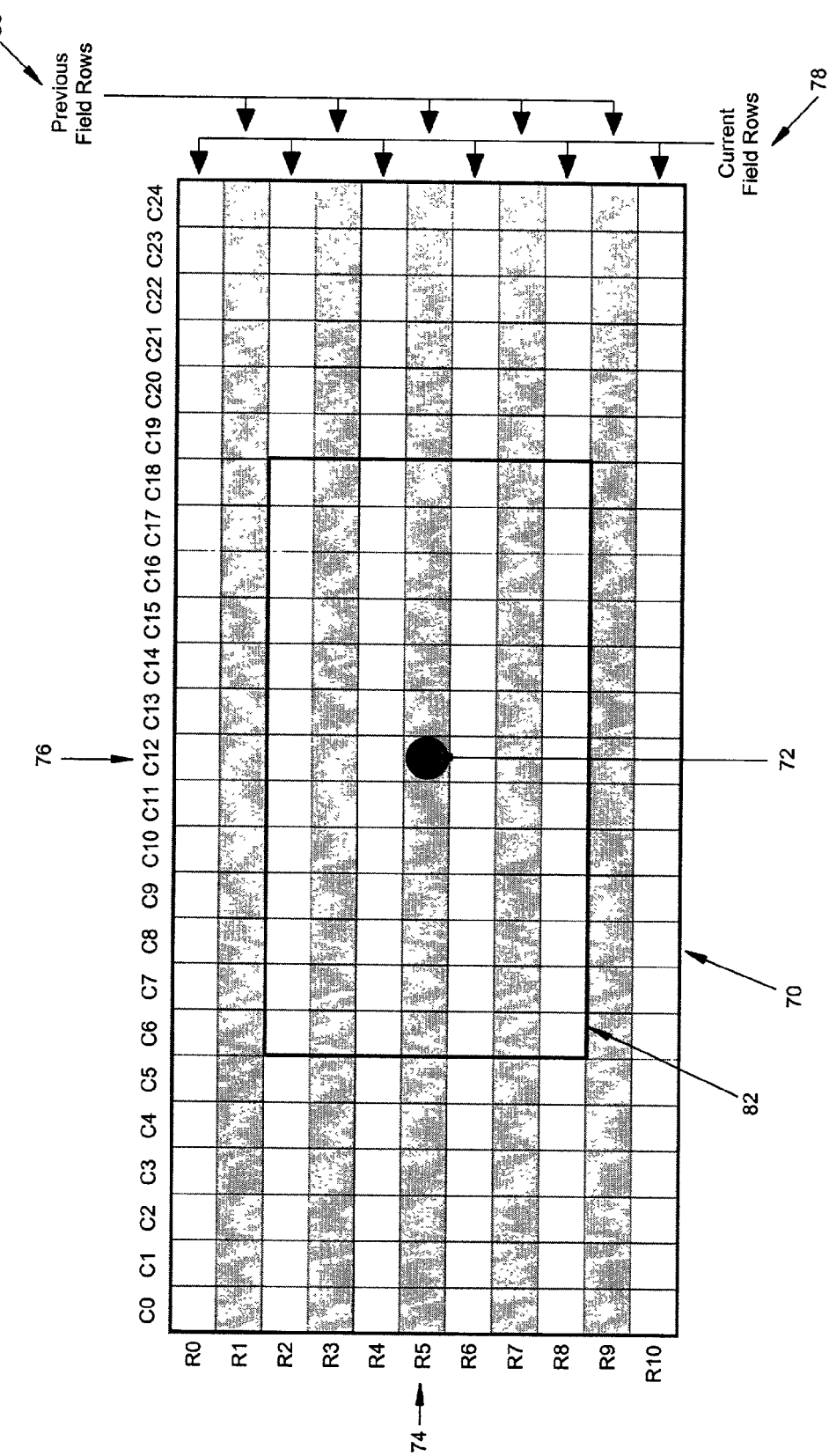
Figure 4: HighPass Filter Pixel Matrix

Figure 5b: 90° (vertical)

Figure 5c: 0° (Horizontal)

– – – Filter Above
········· Filter Below

Figure 5a: Upper/Lower Filter for +45°

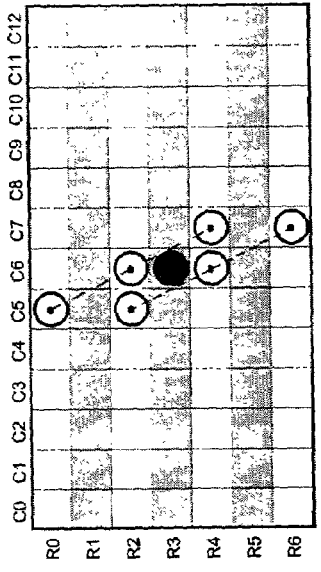
Figure 5f: -60° (nominal, -63° actual)
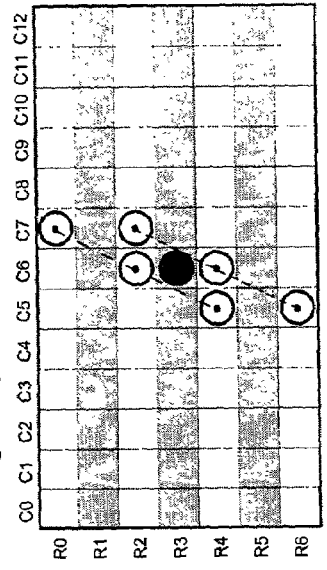
Figure 5g: +60° (nominal, +63° actual)
— — — Filter Above
· · · · · · Filter Below
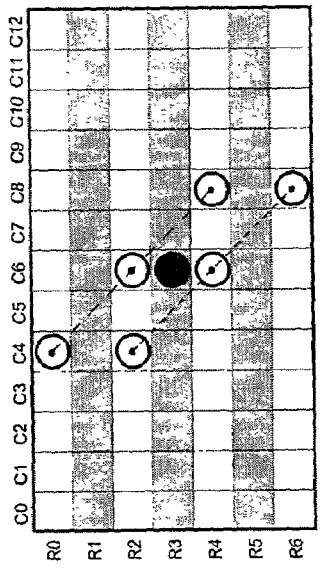
Figure 5d: -45°
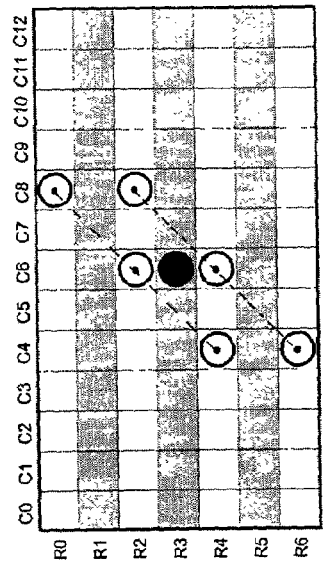
Figure 5e: +45°

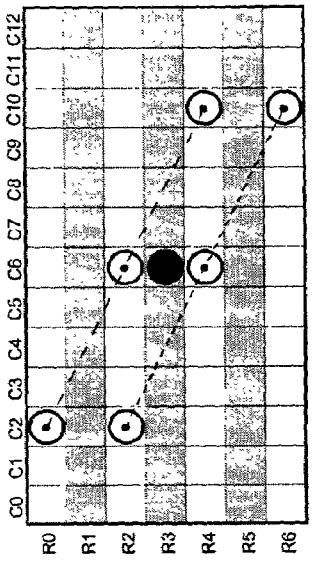
Figure 5h: -15° (nominal, -18° actual)
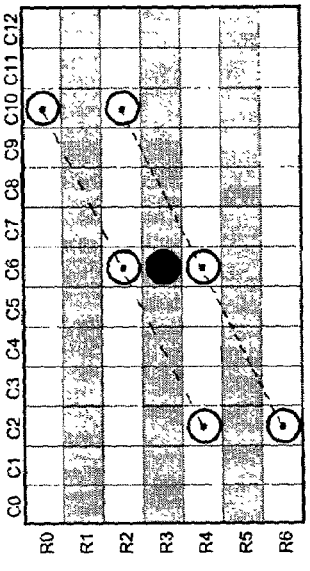
Figure 5i: +15° (nominal, +18° actual)
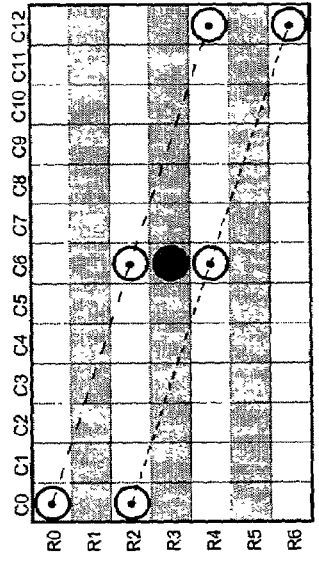
Figure 5j: -30° (nominal, -27° actual)
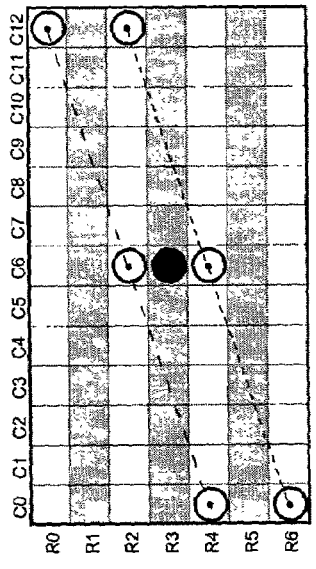
Figure 5k: +30° (nominal, +27° actual)
– – – Filter Above
········· Filter Below

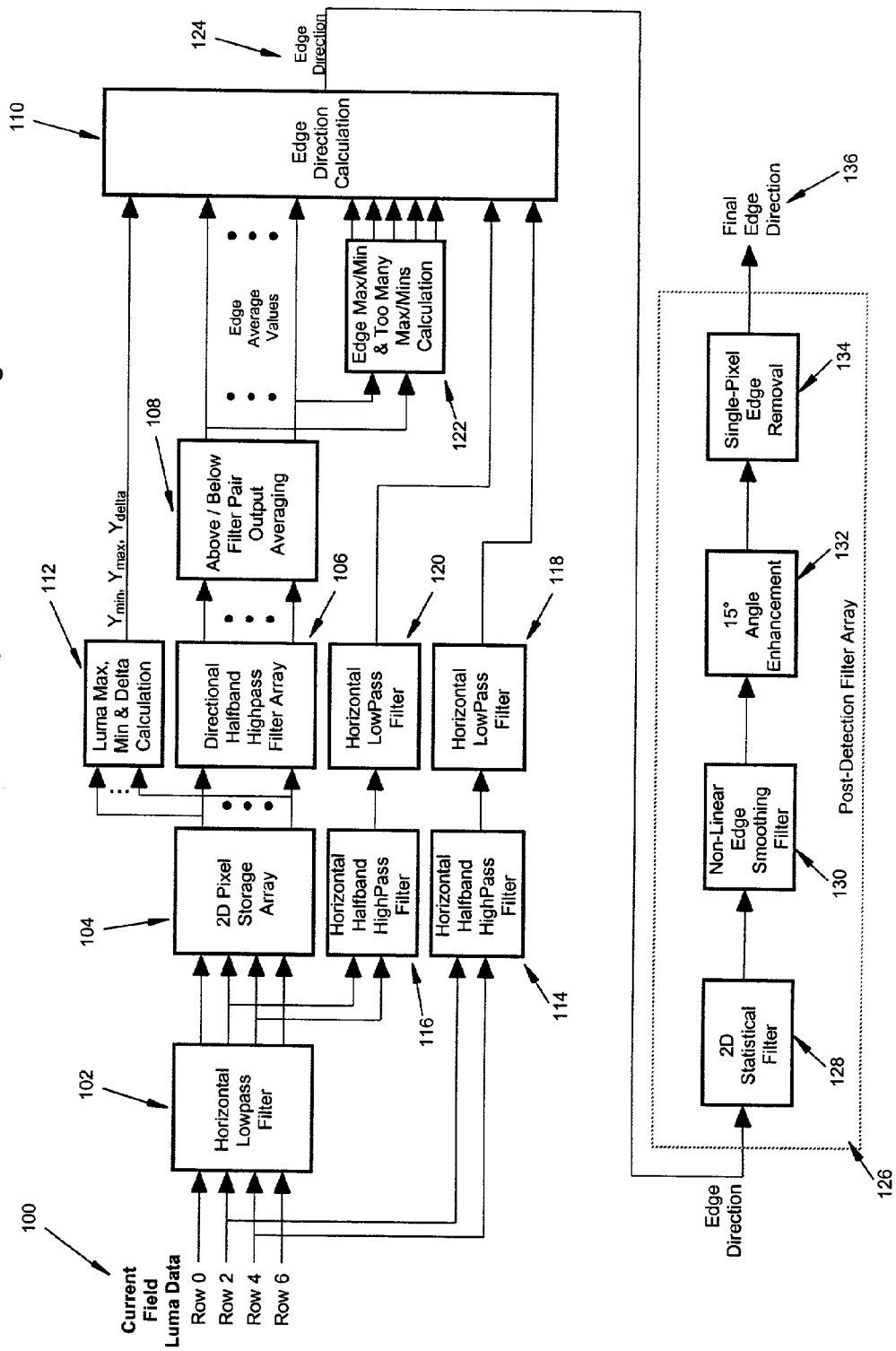
Figure 6: Image Feature Edge Detection Block Diagram

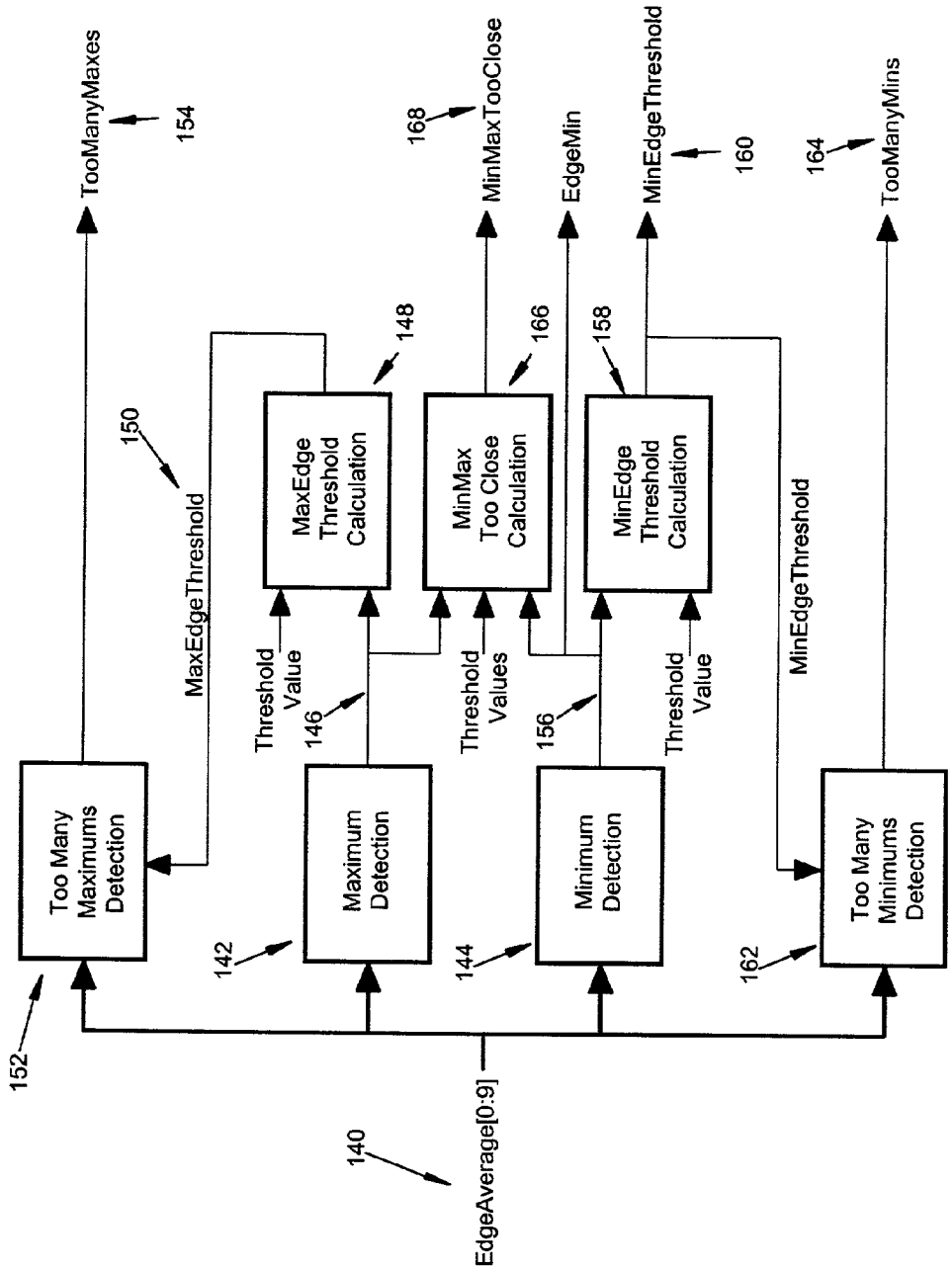
Figure 7: Edge Max/Min & Too Many Maxes/Mins Calculations

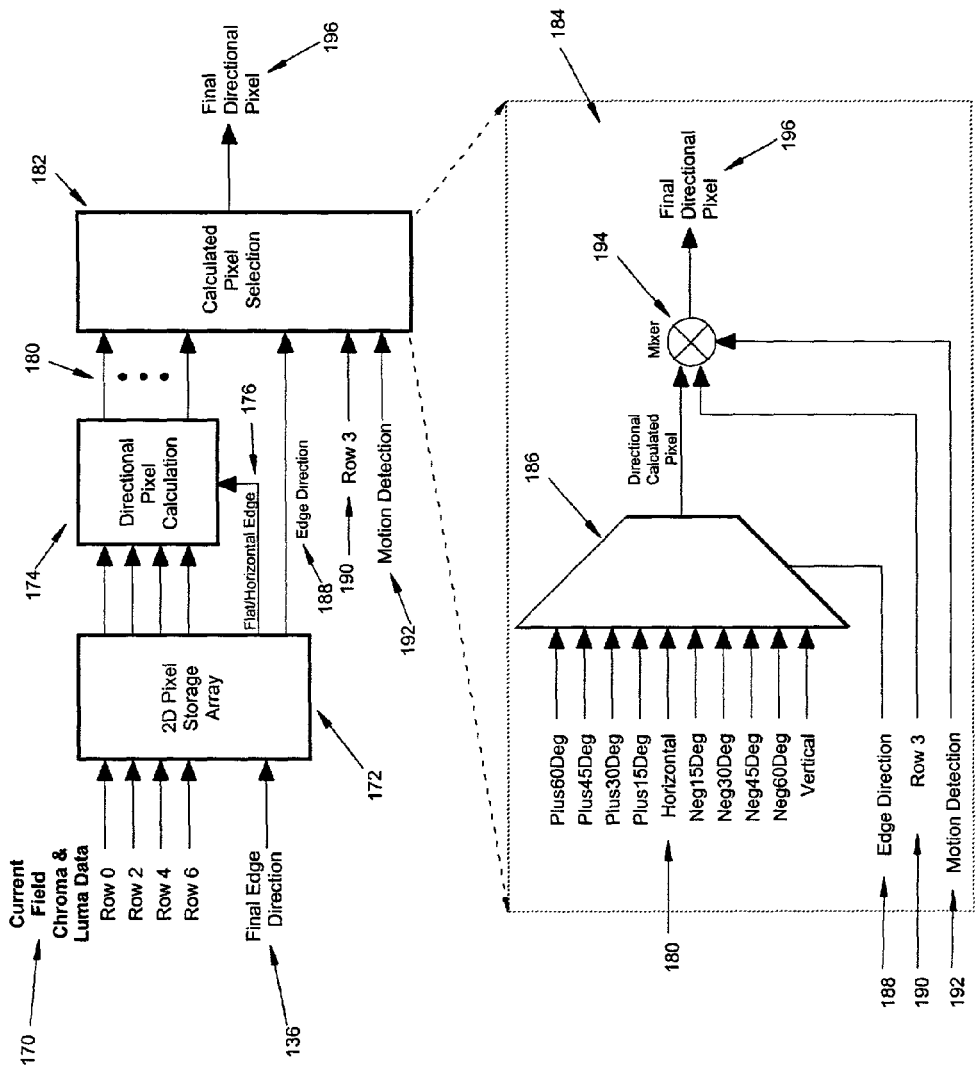
Figure 8: Edge-Based Pixel Calculation Block Diagram

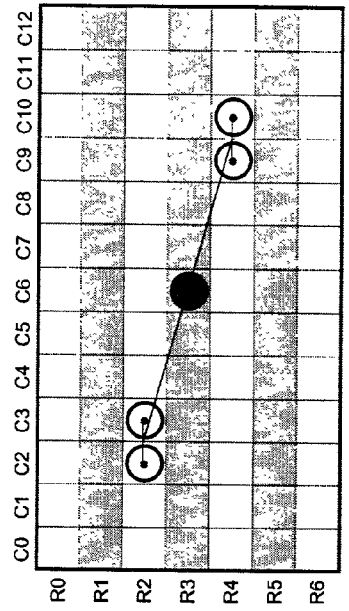
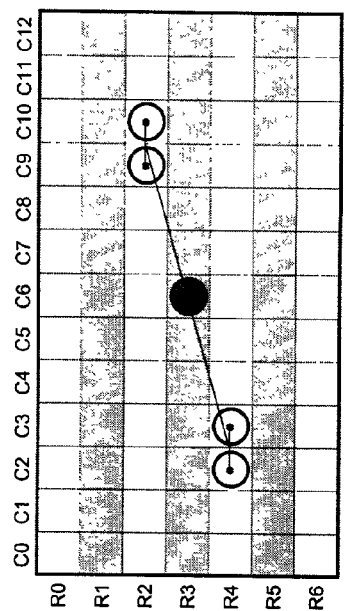
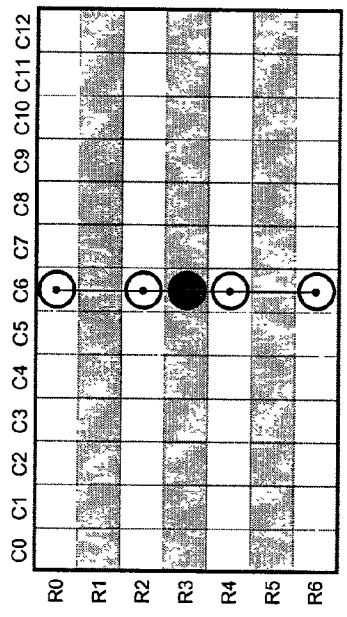
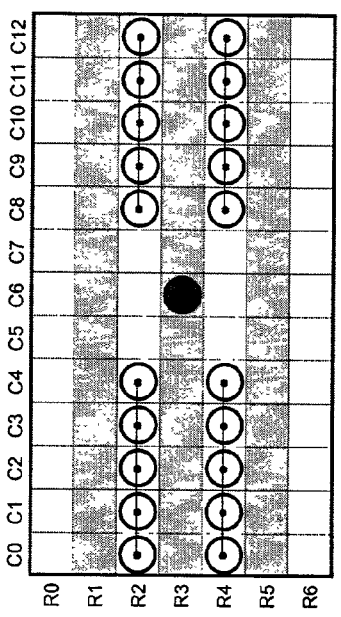

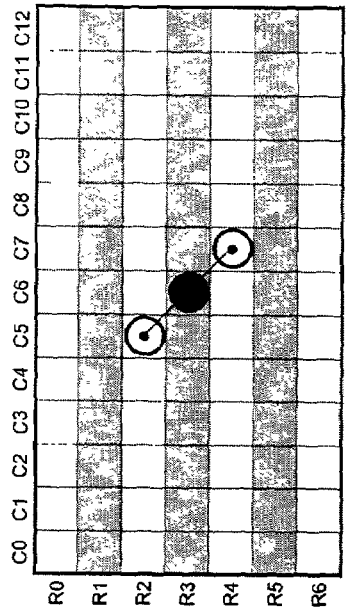
Figure 9g: -45°
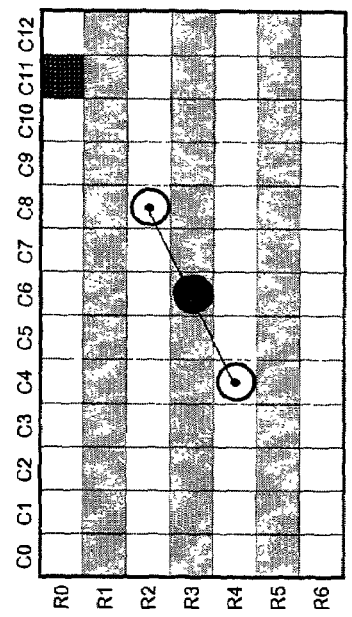
Figure 9h: +45°
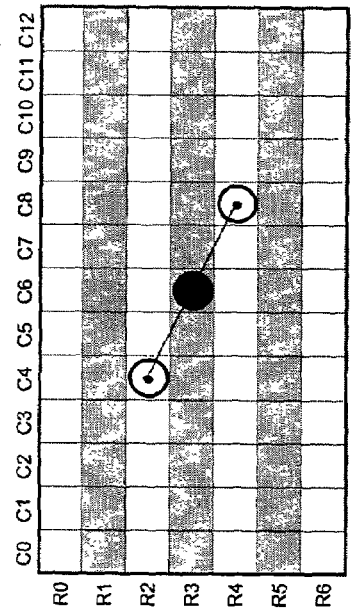
Figure 9e: -30° (nominal, -27° actual)
Figure 9f: +30° (nominal, +27° actual)

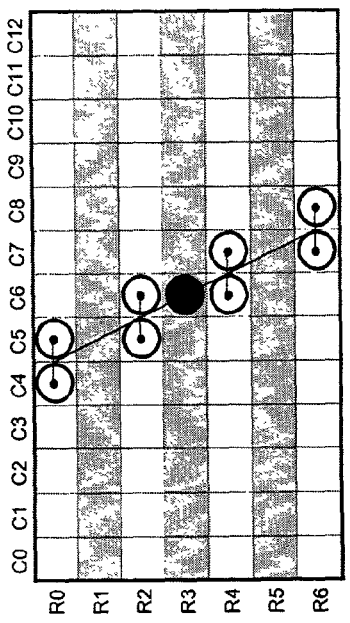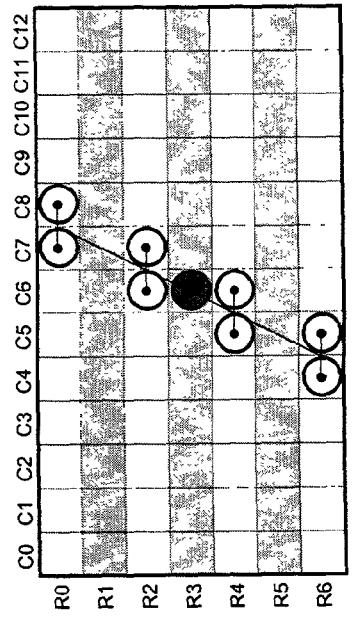

DEINTERLACING OF VIDEO SOURCES VIA IMAGE FEATURE EDGE DETECTION

BACKGROUND OF THE INVENTION

1. Field of the Invention

The present invention relates generally to the processing of video images, and more particularly to techniques for deinterlacing video images.

2. Description of the Related Art

The world's major television standards use a raster scanning technique known as "interlacing". Interlaced scanning draws horizontal scan lines from the top of the screen to the bottom of the screen in two separate passes, one for even numbered scan lines and the other for odd numbered scan lines. Each of these passes is known as a field.

It is often necessary and/or desirable to convert an interlaced video signal to a progressively scanned signal. A single image or frame of a progressively scanned video source is scanned from the top of the screen to the bottom in a single pass. Such a conversion is advantageous, for example, when using a progressive scan display. Many of the display devices used to show interlaced video signals are actually progressive in nature. Common examples of such progressive displays are computer CRTs and liquid crystal displays (LCDs). One advantage of such displays is that they eliminate many of the deficiencies of interlaced video formats, such as flicker, line twitter, and visible scan line structure. Another advantage of the progressive scan format is improvement in the compression ratio of a digital format, such as a digital broadcast or satellite transmission.

In order for such an interlaced video image to be utilized by a progressively scanned video system, it must be converted from an interlaced scan format to a progressive scan format. There are a number of standard techniques for performing this conversion, and range from simple merging of adjacent fields, to interpolation from a single field to form a progressive frame, to more complex motion-adaptive or motion-compensation techniques.

The majority of these techniques require that new pixels be calculated to ensure the deinterlaced output is temporally consistent and has no interlace motion artifacts. The methods used for calculating new pixel information vary widely. Many prior art approaches to the calculation of new pixels are based strictly on vertically aligned pixel data from the temporally current field. Examples of this are shown in FIG. 1, which depicts the specific pixels within a surrounding pixel matrix 10 utilized to calculate a new pixel. FIG. 1A illustrates the calculation of a new pixel value 12 from a vertically aligned pair of pixels 14 by a simple average 16, and FIG. 1B illustrates the calculation of a new pixel 18 from four vertically aligned pixels 20 via a cubic polynomial curve fit 22. These vertically aligned pixel calculation techniques results in a loss of vertical resolution in the output image since computed pixels are based only on a single video field. Since the human visual system is very sensitive to object edges or boundaries, this loss of vertical detail is often very noticeable on diagonal edges of objects, which appear to have a jagged or 'staircased' appearance. An alternate technique used to calculate new pixel values is to take the median value of a number of pixels in the immediate area surrounding the pixel to be calculated, but this approach has met with limited success and often does not remedy the loss of vertical detail.

Prior art approaches to improving deinterlacer performance by eliminating jagged edges have typically involved some degree of detection of diagonal image features and subsequent computation of new pixels based on the temporally current image data along the detected feature. One method, disclosed in U.S. patent application Ser. No. 09/396,993, "Method and Apparatus for Detecting and Smoothing Diagonal Features in Video Images", calculates the slope of a diagonal image feature based on the differences between pairs of pixels in a set of 4 pixels located along 45 degree angles with respect to the pixel to be calculated. As shown in FIG. 1C, a new pixel value 24 is calculated from a group of six surrounding pixels 26 by taking the average 28 of the two pixels located along either a positive 45 degree angle, a negative 45 degree angle, or a vertical angle, based on the calculated slope. Yet another method, disclosed in U.S. Pat. No. 5,936,676 calculates the magnitude of differences between pixel pairs along certain specific angles through the desired pixel location, and determines if a diagonal image feature is present and its orientation based on these differences. As shown in FIG. 1D, a new pixel 30 is then calculated from a group of surrounding pixels 32 by taking the average 34 of the pair of pixels located along the detected angle. Similar techniques (i.e., using the magnitude of pixel pair differences) are also described in U.S. Pat. Nos. 5,638,139 and 6,118,488. U.S. Pat. No. 6,133,957 describes yet another technique which computes the variance between sets of pixels centered along diagonals through the pixel location to be calculated and on opposite sides of the pixel location to be calculated, analyzes the resultant variances for multiple diagonals to identify a diagonal image feature direction as well as a measure of ambiguity of that direction, and then uses that information to compute a new pixel value based on other pixels located along or near the identified direction.

All of these techniques improve deinterlaced image quality to a certain degree, and some have met with more success than others. Some yield objectionable artifacts when the image feature detection either fails completely or yields an erroneous result. All of the disclosed techniques suffer to some extent from the inability to recognize larger image features since all base image feature detection on a relatively small area around the calculated pixel position.

SUMMARY OF THE INVENTION

The present invention provides an improved quality deinterlacer which reliably detects edges in video image features and the direction of the edges, and then uses the result of that detection to calculate new pixels based on pixel data along the edges. It should be appreciated that the present invention and various discrete features thereof can be implemented in numerous ways, including as a process, an apparatus, a system, a device, or a method. Furthermore, various discrete apparatus of the invention can be implemented in software or hardware. Several inventive embodiments of the present invention are described below.

In one embodiment of the present invention, a method for detecting the presence and orientation of image edge features, and then calculating new image pixels based on the detected edge features is disclosed. The method includes filtering a 2-dimensional array of image elements surrounding each pixel location via an array of high-pass filters aligned along a number of different rotational vectors, with a significant null or minimum in the set of filtered data indicating a candidate object edge as well as the direction of that edge. A 2-dimensional array of edge candidates surrounding each pixel location is characterized to invalidate false edges by determining the number of similar and dissimilar edge orientations in the array, and passing the surviving edge candidates through a series of smoothing filters to remove edge detection irregularities and spurious detections, yielding a final edge detection value for each source image pixel location. Pixel locations with a valid edge detection have new pixel data computed for a progressive output image by interpolating from source image pixels which are located along the detected edge orientation.

In another embodiment, a method for deinterlacing a video source is disclosed. The method includes detecting image edge features in an image, detecting an orientation of the image edge features; and calculating a new pixel based on the orientation of image edge features.

In yet another embodiment, a system for the detection of image feature edges includes a lowpass filter responsive to a first, second, third and fourth vertically aligned luma data sample rows and is operative to develop a first, second, third and fourth low pass filtered luma data samples. Also included is a two-dimensional pixel storage array responsive to the first, second, third and fourth lowpass filtered luma data samples and is operative to develop a two-dimensional array of pixel data. Also, a first horizontal halfband highpass filter is receptive to the second and third lowpass filtered luma data samples and is perative to develop a first horizontal highpass filtered luma data sample. A second horizontal halfband highpass filter is receptive to the second and third vertically aligned luma data sample rows and is operative to develop a second horizontal highpass filtered luma data sample. A luma maximum/minimum/delta calculation module is receptive to the two-dimensional array of pixel data and is operative to develop a minimum/maximum/delta. A directional halfband highpass filter array is receptive to the two-dimensional array of pixel data and is operative to develop a set of directional highpass filter outputs. A first horizontal lowpass filter is receptive to the first horizontal highpass filtered luma data sample and is operative to develop a first horizontal lowpass filtered luma data sample. A second horizontal lowpass filter receptive to the second horizontal highpass filtered luma data sample and is operative to develop a second horizontal lowpass filtered luma data sample. An above/below filter pair output averaging module is responsive to the set of directional highpass filter outputs and is operative to develop a set of pair-averaged filter output magnitudes. An edge maximum/minimum calculation module is responsive to the set of pair-averaged filter output magnitudes and is operative to develop a too many maximums signal, a minimum-maximum/too close signal, an edge minimum signal, a minimum edge threshold signal and a too many minimums signal. An edge direction calculation module responsive to the minimum/maximum/delta, the set of pair-averaged filter output magnitudes, the too many maximums signal, the minimum-maximum/too close signal, the edge minimum signal, the minimum edge threshold signal, the too many minimums signal, the first horizontal lowpass filtered luma data sample and the second horizontal lowpass filtered luma data sample and is operative to develop an edge direction. Finally, a post-detection filter array is responsive to the edge direction and is operative to develop a final edge direction.

In an additional embodiment, a system for an edge-based pixel calculation includes a two-dimensional pixel storage array responsive to a set of current field chroma/luma data and a final edge direction and is operative to develop a two-dimensional array of pixel data, a flat/horizontal edge direction indication and an edge direction. Also, a directional pixel calculation module is responsive to the two-dimensional array of pixel data and the flat/horizontal edge direction indication and is operative to develop a set of directional calculated pixels. Finally, a calculated pixel selection module is responsive to the set of directional calculated pixels, the edge direction, a pixel from a previous field and a motion detection signal and is operative to develop a final directional pixel.

In a final embodiment of the present invention, an image feature edge detector includes a horizontal filter means is receptive to a vertically aligned luma data stream and provides a filtered luma data stream. An edge direction calculation means is receptive to the filtered luma data stream and provides an indication of an edge direction. Finally, a post-detection filter array means is receptive to the indication of the edge direction and provides a final indication of an edge direction.

The present invention advantageously allows for the reduction of artifacts in deinterlaced video images. By correctly and accurately identifying edge features in the video image, a video deinterlacer can produce new pixel values derived from other pixels located along edge features in the image. The result is a progressive video image which is free of defects and deinterlacing artifacts. Further, the deinterlacing preserves the maximum amount of vertical detail in the image.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings wherein:

FIG. 1A is an illustration of a simple 2-point linear interpolation of a prior art method.

FIG. 1B is an illustration of a cubic polynomial curve fit of a prior art method.

FIG. 1C is an illustration of a diagonal interpolation of a prior art method.

FIG. 1D is an illustration of pixel pair-wise interpolation along multiple directional vectors of a prior art method.

FIG. 4 illustrates the two dimensional array of pixels used for the directional highpass filters of the present invention.

FIGS. 5A–5K illustrate the data sets utilized by the edge detection highpass filter bank of the present invention, with a subfigure for each of the ten directional filters used.

FIG. 6 illustrates a high level block diagram depicting the image feature edge detection of the present invention.

FIG. 7 illustrates a block diagram of the maximum/minimum edge detection submodule of the present invention.

FIG. 8 illustrates a block diagram of the edge-based pixel calculation method of the present invention.

FIGS. 9A–9J illustrate the data sets utilized by each of the ten directional pixel calculations of the present invention.

DETAILED DESCRIPTION OF THE PREFERRED EMBODIMENTS

A method and apparatus for interlace to progressive scan conversion based on the detection of edges in video image features and calculation of new pixels based on data along those edges is disclosed. In the following description, numerous specific details are set forth in order to provide a thorough understanding of the present invention. It will be understood however that the present invention may be practiced without some or all of these specific details. In other instances, well known process operations have not been described in detail in order not to unnecessarily obscure the present invention.

The present invention improves upon prior art techniques by detecting the presence and orientation of object edges in the image, and, where motion exists, utilizing the edge detection information to compute new pixels based upon pixel data along the object edge. The detection of edges utilizes a novel edge detection technique, different than that used in the prior art, which is applied to a much larger effective array of pixel data than with previous approaches. Unique attributes of the edge detection method significantly reduce the physical data set size, resulting in robust detection of image features. The result is a significant decrease in the presence of jagged edges in the deinterlaced output and a corresponding improvement in perceived image quality.

1. Overview of the Technique

Figure 2A:
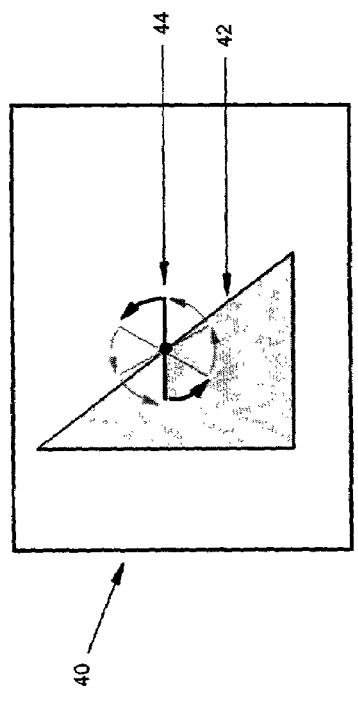
FIG. 2A illustrates a continuously variable direction highpass filter.
Figure 2B:
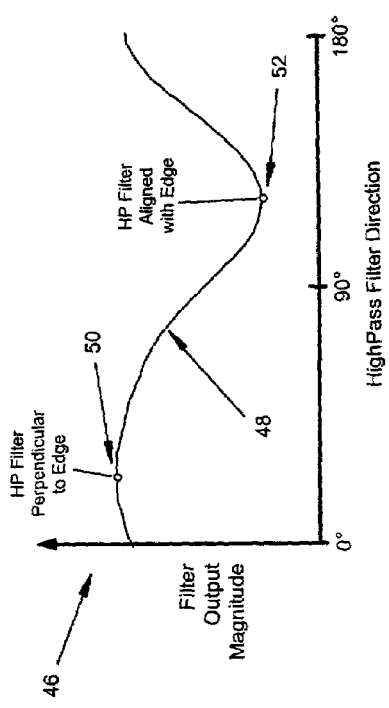
FIG. 2B illustrates the response of a continuously variable direction highpass filter when rotated in the vicinity of an object edge.
Figure 3A:
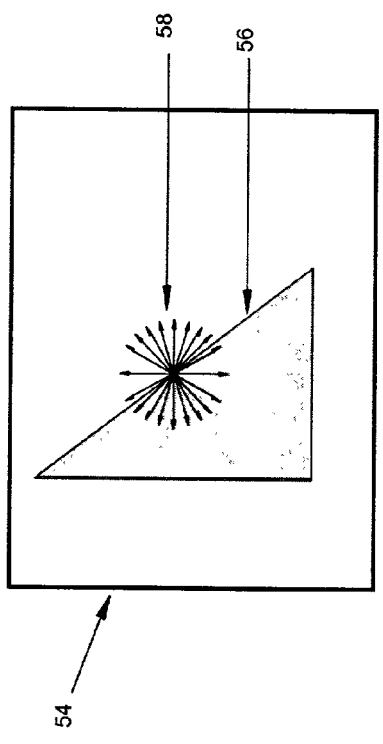
FIG. 3A illustrates a discrete directional highpass filter.
Figure 3B:
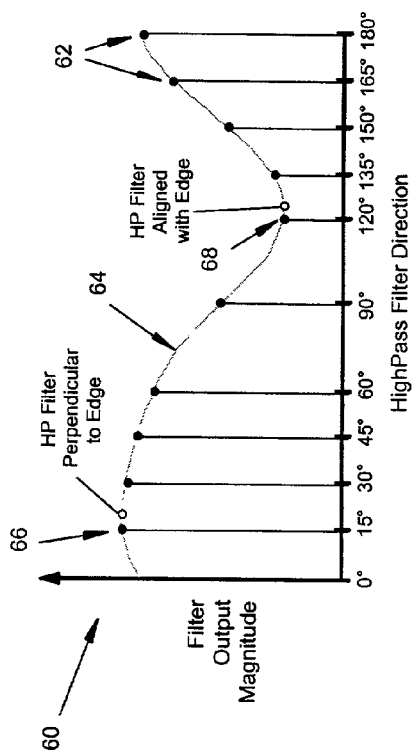
FIG. 3B illustrates the response of an array of directional highpass filters of the present invention in the vicinity of an object edge.

Object edges are detected by high-pass filtering image data from the temporally current field surrounding each new pixel location along a number of different orientations, and then analyzing the filtered data to determine the location and orientation of the edges. In general, high-pass filtering which is aligned with an edge will result in a low filter output level, while high-pass filtering across an edge will detect the high frequencies associated with the edge boundary crossing and will thus result in a relatively high filter output level. This is illustrated in FIG. 2A for a directional highpass filter with a continuously variable direction. An image 40 with an object edge 42 is filtered by a variable direction highpass filter 44. The output of the filter for 180 degrees of rotation are shown in the graph 46, depicted in FIG. 2B. The filter output 48 varies with the filter orientation, with the maximum output 50 occurring when the filter direction is orthogonal to the object edge, and the minimum output 52 occurring when the filter direction is aligned with the object edge. In practice, a continuously variable filter is not feasible, so an array of discrete filters is used, where each filter is oriented along a specific direction. This is illustrated in FIG. 3A. An image 54 with an object edge 56 is filtered by an array of directional highpass filters 58. The output of the array of filters is shown in the graph 60, where the filter outputs are located at discrete points 62—depicted in FIG. 3B. The analogous output 64 of the continuously variable filter of FIG. 2 is also shown for reference. The directional filter most closely aligned with the direction orthogonal to the object edge will yield the highest filter output value 66, while the directional filter most closely aligned with the object edge will yield the lowest filter output 68. In general, sorting the outputs of the array of highpass filters for the lowest value will tend to yield the orientation of the object edge, assuming a valid edge is actually present.

The output of the filters are then processed to exclude a number of cases of erroneous edge detection:

1) where the filter output values are very close together, indicating that no true object edge is present;
2) where a large number of different orientations are present in a relatively small area, indicating the presence of noise or a high level of image detail yielding unresolvable edges;
3) where there is not a significant number of similar edge orientations in the surrounding area, indicating that there is not a coherent edge present.

The qualified edge detection value is then put through a series of low-pass filtering and smoothing operations which remove single-pixel sized detections as well as discontinuities and/or erratic behavior of the edge direction.

The resulting final edge detection value is used to determine the set of pixels from the temporally current field of the source image which is used to calculate a new output pixel. Only pixels along the detected edge orientation are used in the calculation, thus reducing the presence of jagged edges in the resultant output image. As with previous techniques, the calculated pixel is blended with an original video source pixel from a temporally non-current field, where the blending operation is controlled by the strength of a motion detection signal. (i.e., strong motion results in the calculated pixel being used; no motion results in the source pixel being used; intermediate motion results in a mix of the two in proportion to the motion strength.) This technique results in an output image with many fewer noticeable deinterlacing artifacts along object edges, a higher apparent resolution, and a therefore more subjectively pleasing image.

This invention is applicable to all interlaced image sequences, including those derived from NTSC, PAL, SECAM, and 1080i HDTV video standards. It incidentally also improves the apparent performance of deinterlacing from progressive sources such as film, since video deinterlacing artifacts are less noticeable when loss of film lock occurs and the deinterlacer changes its operational mode from simply assembling fields into the original frames to calculating new pixel values in areas of motion.

2. Detailed Description of the Technique

The edge detection method of the preferred embodiment of the present invention is performed upon a two dimensional array of pixels 70, as shown in FIG. 4. The array is centered around the pixel to be calculated 72, and is composed of eleven rows 74 and twenty-five columns 76 of pixels. The even numbered rows 78 are from the temporally current field and are the basis of the edge detection calculation. The odd numbered rows 80 are from the field immediately previous to the current field. These previous field rows are interleaved with the current field rows due to the interlaced nature of the video source. The previous field rows are not used in the actual edge detection calculations since they are not temporally consistent with the temporal baseline of the current field.

The highpass filters algorithms used in the preferred embodiment are halfband filters, designed to pass roughly half of the video signal bandwidth. Two different halfband filter topologies are used, one with 5 data samples and another with 9 data samples. The filter response equation for the 5-point filters of the preferred embodiment is:

$$\text{HP5 output}=(0*P-2)-(0.25*P-1)+(0.5*P0)-(0.25*P+1)+(0*P+2) \qquad \text{EQUATION 1}$$

while the filter response equation for the 9-point filters of the preferred embodiment is:

HP9 output=(0*P−4)+(0.032892*P−3)+(0*P−2)−
(0.284054*P−1)+(0.5*P0)−

(0.284054*P+1)+(0*P+2)+(0.032892*P+3)+(0*P+4)  EQUATION 2 where P0 is the center pixel location of the data set to be filtered. It is significant that in both filter topologies some of the coefficient values are zero. The data samples which are multiplied by the zero valued coefficient(s) need not actually be present since they have no effect on the final highpass filter output. Because of this, the physical array of data samples actually required is significantly reduced, and is shown as the smaller rectangle 82 in FIG. 4. The presence of the zero coefficients, and the subsequent reduction in the required physical data set size, is a major reason for the use of halfband filters. For hardware minimization purposes, the implementation of the 9-point filters in the preferred embodiment uses actual coefficients of 9/32 in place of 0.284054, and 1/32 in place of 0.032892.

Each highpass filter type uses an odd number of data samples, with the middle data sample aligned on the location of interest, which in this case is the pixel to be calculated. This location, however, is by its nature in the previous field, and therefore cannot be used. The closest adjacent location is either the pixel directly above or directly below the pixel to be calculated. This is shown in FIG. 5A for an example case of a positive forty-five degree angle filter, where the pixel to be calculated 90 is in the previous field. The data sample locations for the two possible filter calculations are shown, with one filter being centered on the pixel below 92, and one centered on the pixel above 94. Since neither filter is correctly aligned spatially with the pixel location to be calculated 90, both filters are calculated and the magnitudes of the two results averaged to form an estimate of the high frequency components located along a positive forty-five degree angle through the desired location. This dual filter averaging approach is used for all the directional filters of the present invention. As noted above, some data sample locations have zero-valued coefficients. These are shown in FIG. 5A as gray circles 96. FIGS. 5B though 5F depict the specific pixel locations used for each of the directional filter pairs used in the preferred embodiment, and include filters for nominal angles of zero degrees (horizontal), +/− 15 degrees, +/− 30 degrees, +/− 45 degrees, +/− 60 degrees, and 90 degrees (vertical). Pixel locations with zero coefficients are not shown, and only a seven-row by thirteen-column pixel matrix is therefore depicted. The horizontal filters shown in FIG. 5C are the only ones which use a more accurate 9-point halfband implementation due to the larger number of data samples available for the horizontal orientation. It should be noted that for FIG. 5B (90 degree/vertical), it may appear that only one filter is used with four pixel locations for the filter calculation. This however is not the case. It can readily be seen in FIGS. 5A and 5C–5K that the two filters are depicted with two different types of dashed lines. Closer inspection of FIG. 5B also shows this in column C6. For the 90 degree/vertical case, the two filters overlap each other resulting in the lower two data points of the top filter to overlap with the upper two data points of the lower filter.

In view of the foregoing, it will be appreciated that a method for deinterlacing a video source includes detecting edge features in an image, detecting the orientation of the image edge features and calculating a new pixel based on the orientation of the image edge features. The method can also include filtering a 2-dimensional array of image elements surrounding a pixel location resulting in a filtered set of data. A significant null or minimum in the set of filtered data indicates the edge and the orientation of the image. The 2-dimensional array of image elements is characterized to invalidate a false edge by determining a number of similar edge orientations and a number of dissimilar edge orientations and passing any remaining edges of the image through a set of smoothing filters to produce a final edge detection value for each source image pixel location.

The filtered set of data is obtained at a plurality of angles surrounding the pixel location relative to a horizontal. The plurality of angles is comprised of 90°, 0°, −15°, 15°, −30°, 30°, −45°, 45°, −60° and 60° angles. The filtered set of data is obtained for the 90°, −15°, 15°, −30°, 30°, −45°, 45°, −60° and 60° angles by obtaining a first previous pixel location, a first pixel location and a first next pixel location adjacent to a first side of the pixel location along a current angle relative to the horizontal. Additionally, a second previous pixel location, a second pixel location and a second next pixel location adjacent to a second side of the pixel location along the current angle relative to the horizontal is obtained. The first previous pixel location and the first next pixel location are quartered. The first pixel location is halved. The quartered first previous pixel location and the quartered first next pixel location are summed. Subtracting the sum of the quartered first previous pixel location and the quartered first next pixel location from the halved first pixel location resulting in a first high pass filter output. Quartering the second previous pixel location and the second next pixel location. Halving the second pixel location. Summing up the quartered second previous and the quartered second next pixel location. Subtracting the sum of the quartered second previous and the quartered second next pixel location from the halved second pixel location resulting in a second high pass filter output. And finally averaging a magnitude of the first high pass filter output and a magnitude of the second high pass filter output resulting in a final highpass filter output for the current angle.

The filtered set of data is obtained for the 0° angle by obtaining a first set of first and third previous pixel locations, a first pixel location and a first and third next pixel locations adjacent to a first side of the pixel location along a current angle relative to the horizontal. Obtaining a second set of first and third previous pixel locations, a second pixel location and a first and third next pixel locations adjacent to a second side of the pixel location along the current angle relative to the horizontal. Multiplying the third previous pixel location of the first set by 0.032892. Multiplying the first previous pixel location of the first set by −0.284054. Halving the first pixel location. Multiplying the first next pixel location of the first set by −0.284054. Multiplying the third next pixel location of the first set by 0.032892. Summing up the multiplied pixel locations of the first set resulting in a first high pass filter output. Multiplying the second previous pixel location of the second set by 0.032892. Multiplying the first previous pixel location of the second set by −0.284054. Halving the first pixel location. Multiplying the first next pixel location of the second set by −0.284054. Multiplying the third next pixel location of the second set by 0.032892. Summing up the multiplied pixel locations of the second set resulting in a second high pass filter output. And finally, averaging the magnitudes of the first and second high pass filter outputs resulting in a final highpass filter output for the current angle.

A block diagram of the preferred embodiment of the edge detection method is shown in FIG. 6. Luma pixel data from four rows of the current field 100 is presented to a horizontal lowpass filter 102, which filters the raw pixel data to remove noise and small irregularities in the image prior to edge detection. It will be appreciated by one skilled in the art that the horizontal lowpass filter 102 could be a vertical lowpass filter that filters vertically. Also, the filter 102 could also be a horizontal/vertical lowpass filter that filters in both the horizontal and vertical directions. The lowpass-filtered pixel data is stored in a two-dimensional pixel storage array 104, which stores thirteen luma data samples for each of the four input rows. This 2D array of pixel data is made available to the previously described bank of directional halfband highpass filters 106, which calculate the amplitude of the high frequency components in the video image along ten different directional vectors (as shown in FIG. 5), with two filters (above and below pixel to be calculated) for each of the ten directions. The magnitudes of the outputs of the same-direction filter pairs are averaged by module 108. The averaged directional highpass filter values are provided as input to the edge direction calculation module 110, which selects a single edge direction based on the directional highpass filter outputs and a number of other parameters described below.

The output of the 2D pixel storage array 104 is also sent to a module 112 which calculates the maximum luma value in the 2D array, the minimum luma value in the array, and the dynamic range of the luma values in the array (where dynamic range is maximum minus minimum). These three luma characteristics are provided to edge direction calculation module 110 as an aid in choosing the correct edge direction.

The widely spaced data samples used in certain of the halfband highpass filters 106 allow the possibility of aliasing errors in the filter output signals. The specific filters which are susceptible to aliasing are the ones for +/− 15 degrees, +/− 30 degrees, and +/− 45 degrees. It is desirable to inhibit the detection of these edges in the presence of very high horizontal frequencies. To detect when such aliasing errors can occur, a pair of horizontal halfband highpass filters 114 and 116 are used to detect the horizontal high frequency content of the signal. One of the two filters 114 directly filters the raw luma input data 100, while the other of the two filters 116 filters the output of the horizontal lowpass filter 102. The output of these highpass filters is then passed through a pair of lowpass filters 118 and 120 to reduce minor irregularities in their responses. The pair of smoothed high frequency detection signals is then sent to the edge direction calculation module 110 to aid in the choosing of the correct edge direction. An alternate implementation option to reduce the possibility of aliasing is to lowpass filter the pixel data to remove the high frequencies which are subject to aliasing. While this is a valid technique, it requires a significantly more complex implementation than the disqualification method described above, and therefore was not chosen for the preferred embodiment. It remains a valid technique, however, and should be considered within the bounds of the present invention.

The pair-averaged filter outputs from module 108 are also sent to module 122 which detects a number of conditions which further serve to disqualify the erroneous detection of image feature edges. Indications of these conditions are sent to the edge direction calculation module 110 to aid in the choosing of the correct edge direction. The function of module 122 is shown in more detail in FIG. 7. The ten pair-averaged highpass filter values 140 are sent to module 142 which detects the maximum value 146 in the set of ten, and module 144 which detects the minimum value 156 in the set of ten. The minimum value 156 is passed on to the edge direction calculation module 110 as an aid in choosing the correct edge direction. The maximum edge value 146 is used to determine a maximum edge threshold value 150 by module 148, which is the maximum edge value 146 minus a fixed threshold value. (The fixed threshold value may be replaced by a variable threshold parameter, whose value depends on the luma levels determined by module 112.) The maximum edge threshold 150 is used by module 152 to determine if all the averaged edge values 140 exceed the maximum edge threshold 150. In this case, a 'too many maximums' signal 154 is produced which indicates that no true edge is present since the highpass filter values are all too close to the maximum detected value. This signal is sent to the edge direction calculation module 110 as an aid in choosing the correct edge direction. The detected minimum signal 156 is also used to determine a minimum edge threshold value 160 by module 158, which is the minimum edge value 156 plus a fixed threshold value. (The fixed threshold value may be replaced by a variable threshold parameter, whose value depends on the luma levels determined by module 112.) The minimum edge threshold 160 is used by module 162 to determine if more than two of the averaged edge values 140 are less than the minimum edge threshold 160. If so, a 'too many minimums' signal 164 is produced with indicates that no true edge is present because too many of the highpass filters yielded low values, thus making it impossible to choose which of the several possible directions is correct. This signal is sent to the edge direction calculation module 110 as an aid in choosing the correct edge direction. The maximum edge value 146 and the minimum edge value 156 are also sent to module 166, which determines if these two values are too close together to indicate a valid edge detection. This decision is based on a fixed or variable threshold value—i.e., if the difference between the maximum 146 and minimum 156 edge values are less than the threshold, then a 'minimum and maximum too close together' signal 168 is produced which indicated that no valid edge can be chosen. This signal is sent to the edge direction calculation module 110 as an aid in choosing the correct edge direction.

As previously described, the edge direction calculation module 110 receives a number of input signals, and based on the values of these signals, chooses either one of the ten possible edge directions or that no valid edge is present. A signal 124 is produced which indicates the chosen direction (some values of signal 124 indicate that no valid edge is present). The edge direction selection process is somewhat complex and is governed by the following factors:

1) No valid edge may be present if there are too many maximums 154, too many minimums 154, or the minimum and maximum are too close together 168. These conditions all indicate the overall highpass filter output curve (64, as shown in FIG. 3) does not show the correct characteristics which indicate either a true edge or an identifiable edge direction.
2) If the minimum highpass filter output value is too large, then a true edge may not have been detected. The detected minimum signal 156 is compared to a threshold value, and if it is above this threshold value, no edge is deemed to have been detected. The threshold is proportional to the overall dynamic range of the luma signal.
3) The +/− 15 degree, +/− 30 degree, and +/− 45 degree filters are subject to potential aliasing problems. If the horizontal high frequency detection signals 118 and 120 are of sufficient magnitude, then the choice of these edge directions is inhibited.
4) If none of the above conditions are true, then an edge direction choice can be made if there are no more than two pair-averaged highpass filter output signals 140 which are above the minimum edge threshold value 160. The choice is made according the following prioritized scheme:
a) If both +15 and −15 degree filter outputs are below the minimum threshold 160, then the horizontal direction is chosen,
b) else if both the horizontal and +30 degree filter outputs are below the minimum threshold 160, then the +15 degree direction is chosen,
c) else if the +15 degree filter output is below the minimum threshold 160 and none of the vertical, −60 degree, +60 degree, and −45 degree filter outputs is below the minimum threshold 160, then the +15 degree direction is chosen,
d) else if both the horizontal and −30 degree filter outputs are below the minimum threshold 160, then the −15 degree direction is chosen,
e) else if the −15 degree filter output is below the minimum threshold 160 and none of the vertical, −60 degree, +60 degree, and +45 degree filter outputs is below the minimum threshold 160, then the −15 degree direction is chosen,
f) else if the horizontal filter output is equal to the detected minimum signal 156 and none of the vertical, −60 degree, and +60 degree filter outputs is below the minimum threshold 160, then the horizontal direction is chosen,
g) else if the +30 filter output is equal to the detected minimum signal 156 and none of the −30 degree, −45 degree, and −60 degree filter outputs is below the minimum threshold 160, then the +30 degree direction is chosen,
h) else if the −30 filter output is equal to the detected minimum signal 156 and none of the +30 degree, +45 degree, and +60 degree filter outputs is below the minimum threshold 160, then the −30 degree direction is chosen,
i) else if the +45 filter output is equal to the detected minimum signal 156 and none of the −30 degree, −45 degree, and −60 degree filter outputs is below the minimum threshold 160, then the +45 degree direction is chosen,
j) else if the −45 filter output is equal to the detected minimum signal 156 and none of the +30 degree, +45 degree, and +60 degree filter outputs is below the minimum threshold 160, then the −45 degree direction is chosen,
k) else if the +60 filter output is equal to the detected minimum signal 156 and neither of the −30 degree −45 degree filter outputs is below the minimum threshold 160, then the +60 degree direction is chosen,
l) else if the −60 filter output is equal to the detected minimum signal 156 and neither of the +30 degree and +45 degree filter outputs is below the minimum threshold 160, then the −60 degree direction is chosen,
m) else if the vertical filter output is equal to the detected minimum signal 156 and none of the −30 degree, −45 degree, +30 degree, and +45 degree filter outputs is below the minimum threshold 160, then the vertical direction is chosen,
n) else no direction is chosen.

The output of this algorithm is a 4-bit edge direction signal 124 which indicates either the direction of a detected image feature edge or that no edge was detected.

The selected edge direction signal 124 is then passed through a series of filters 126 which removes random or uncorrelated edge detection values, smooths the edge detection results—particularly for oblique angles, and eliminates single-pixel edge detection occurrences.

The first filter in the series is a two-dimensional statistical filter 128. It examines a two-dimensional array of edge detection values centered around a given edge detection value and validates that value based on the number of and proximity of both similar and dissimilar values at other array locations. For each dissimilar edge value within the array (where 'dissimilar' is defined as not the same as or not an angle adjacent to), a proximity-weighted value is determined, where the value is higher at locations closer to the given edge detection value and lower at locations further away. The sum of all these weighted values is computed. An identical process is performed for edge detection values in the array which are similar to the given value (where 'similar' is defined to be the same direction as or a directly adjacent direction), with a comparable set of proximity-based weighting factors. A sum is also computed for the similar direction values. If the different value sum is greater than that similar value sum minus a constant value, and the different value sum is greater than a predetermined threshold, then the given edge direction value is assumed to be inaccurate due to either the lack of correlated similar edge directions in the surrounding area or because of the large number of dissimilar edge directions in the surrounding area. Such inaccurate edge detection values are changed to indicate that no edge or direction was identified at that location.

The next filter in line 130 is a non-linear smoothing filter, which removes slight local variations of the edge detection to provide a more regular and coherent edge structure. The edge detection values to the immediate left and right of the current position are examined, and if they are both the same then the current position is set to that value. This removes single pixel wide detection values in the middle of a larger coherent edge detection. If the left and right edge detection values are from adjacent edges but the current pixel is not, then the current pixel location is set to match the left value. Additional smoothing is performed in the area of very oblique angles (+/− 15 degrees and horizontal), with the current pixel being set to a value similar to that of the surrounding edge.

The third filter 132 is intended to further smooth 15 degree angles. If the current pixel's direction has been detected as horizontal or invalid, and the pixel to the left or right has been detected as a 15 degree angle, then the current location is set to the same 15 degree angle. Alternatively, if the current pixel's direction has been detected as horizontal or invalid, and the pixel to the left or right has been detected as a −15 degree angle, then the current location is set to the same −15 degree angle.

The fourth filter 134 removes any remaining single pixel wide edge detection values. The final output 136 of the series of post edge detection filters is the final determined edge direction and determines the method used to calculate a new pixel value.

Briefly, a system for the detection of image feature edges includes a lowpass filter responsive to a first, second, third and fourth vertically aligned luma data sample rows and is operative to develop a first, second, third and fourth low pass filtered luma data samples. The lowpass filter can also be a horizontal lowpass filter or a vertical lowpass filter. Also included is a two-dimensional pixel storage array responsive to the first, second, third and fourth lowpass filtered luma data samples and is operative to develop a two-dimensional array of pixel data. Also, a first horizontal halfband highpass filter is receptive to the second and third lowpass filtered luma data samples and is perative to develop a first horizontal highpass filtered luma data sample. A second horizontal halfband highpass filter is receptive to the second and third vertically aligned luma data sample rows and is operative to develop a second horizontal highpass filtered luma data sample. A luma maximum/minimum/delta calculation module is receptive to the two-dimensional array of pixel data and is operative to develop a minimum/maximum/delta. A directional halfband highpass filter array is receptive to the two-dimensional array of pixel data and is operative to develop a set of directional highpass filter outputs. A first horizontal lowpass filter is receptive to the first horizontal highpass filtered luma data sample and is operative to develop a first horizontal lowpass filtered luma data sample. A second horizontal lowpass filter receptive to the second horizontal highpass filtered luma data sample and is operative to develop a second horizontal lowpass filtered luma data sample. An above/below filter pair output averaging module is responsive to the set of directional highpass filter outputs and is operative to develop a set of pair-averaged filter output magnitudes. An edge maximum/minimum calculation module is responsive to the set of pair-averaged filter output magnitudes and is operative to develop a too many maximums signal, a minimum-maximum/too close signal, an edge minimum signal, a minimum edge threshold signal and a too many minimums signal. An edge direction calculation module responsive to the minimum/maximum/delta, the set of pair-averaged filter output magnitudes, the too many maximums signal, the minimum-maximum/too close signal, the edge minimum signal, the minimum edge threshold signal, the too many minimums signal, the first horizontal lowpass filtered luma data sample and the second horizontal lowpass filtered luma data sample and is operative to develop an edge direction. Finally, a post-detection filter array is responsive to the edge direction and is operative to develop a final edge direction.

Additionally, the post-detection filter array includes a two-dimensional statistical filter responsive to the edge direction and is operative to develop a first filtered edge direction. Also, a non-linear edge smoothing filter is responsive to the first filtered edge direction and is operative to develop a second filtered edge direction. A 15° angle enhancement filter is responsive to the second filtered edge direction and is operative to develop a third filtered edge direction. Finally, a single-pixel edge removal filter is responsive to the third filtered edge direction and is operative to develop the final edge direction.

The edge maximum/minimum calculation module includes a maximum detection responsive to the set of pair-averaged filter output magnitudes and is operative to develop a maximum edge value. A maximum edge threshold calculation is responsive to the maximum edge value and a first threshold value and is operative to develop a maximum edge threshold value. A too many maximums detection is responsive to the set of pair-averaged filter output magnitudes and the maximum edge threshold value and is operative to develop the too many maximums signal. A minimum detection is responsive to the set of pair-averaged filter output magnitudes and is operative to develop the edge minimum signal. A minimum edge threshold calculation is responsive to the edge minimum signal and a second threshold value and is operative to develop the minimum edge threshold signal. A too many minimums detection is responsive to the set of pair-averaged filter output magnitudes and the minimum edge threshold signal and is operative to develop the too many minimums signal. Finally, a minimum/maximum too close calculation module is responsive to the maximum edge value, the edge minimum signal and a third threshold value and is operative to develop the minimum-maximum/too close signal.

The edge direction calculation module determines the edge direction is not a valid edge if the too many maximums signal, the minimum-maximum/too close signal or the too many minimums signal is received from the edge maximum/minimum calculation module. The edge direction calculation module also determines the edge direction is not a valid edge if the edge minimum threshold signal received from the edge maximum/minimum calculation module is greater than about a threshold value which is proportional to a luma delta component of the minimum/maximum/delta. Additionally, the edge direction calculation module inhibits the selection of a −45°, a −30°, a −15°, a 15°, a 30° and a 45° edge direction if the first horizontal lowpass filtered luma data sample and the second horizontal lowpass filtered luma data sample are greater than about a first threshold.

If the edge direction calculation module has received no indication of a non-valid edge from the edge maximum/minimum calculation module and no more than two of the set of pair-averaged filter outputs are less than about the minimum edge threshold signal, then the edge direction is determined to be 0° if a −15° and a 15° filter output selected from the set of pair-averaged filter outputs are below about the minimum edge threshold signal. Else if, the edge direction is determined to be 15° if a 0° and a 30° filter output selected from the set of pair-averaged filter outputs are below about the minimum edge threshold signal. Else if, the edge direction is determined to be 15° if the 15° filter output selected from the set of pair-averaged filter outputs is below about the minimum edge threshold signal and a 90°, a −60°, a 60° and a −45° filter outputs selected from the set of pair-averaged filter outputs are above about the minimum edge threshold signal. Else if, the edge direction is determined to be −15° if the 0° and a −30° filter output selected from the set of pair-averaged filter outputs are below about the minimum edge threshold signal. Else if, the edge direction is determined to be −15° if the −15° filter output selected from the set of pair-averaged filter outputs is below about the minimum edge threshold signal and the 90°, the −60°, the 60° and the +45° filter outputs selected from the set of pair-averaged filter outputs are above about the minimum edge threshold signal. Else if, the edge direction is determined to be 0° if the 0° filter output selected from the set of pair-averaged filter outputs is equal to the edge minimum signal and the 90°, the −60° and the 60° filter outputs selected from the set of pair-averaged filter outputs are above about the minimum edge threshold signal. Else if, the edge direction is determined to be 30° if the 30° filter output selected from the set of pair-averaged filter outputs is equal to the edge minimum signal and the −30°, the −45° and the −60° filter outputs selected from the set of pair-averaged filter outputs are above about the minimum edge threshold signal. Else if, the edge direction is determined to be −30° if the −30° filter output selected from the set of pair-averaged filter outputs is equal to the edge minimum signal and the 30°, the 45° and the 60° filter outputs selected from the set of pair-averaged filter outputs are above about the minimum edge threshold signal. Else if, the edge direction is determined to be 45° if the 45° filter output selected from the set of pair-averaged filter outputs is equal to the edge minimum signal and the −30°, the −45° and the −60° filter outputs selected from the set of pair-averaged filter outputs are above about the minimum edge threshold signal. Else if, the edge direction is determined to be −45° if the −45° filter output selected from the set of pair-averaged filter outputs is equal to the edge minimum signal and the 30°, the 45° and the 60° filter outputs selected from the set of pair-averaged filter outputs are above about the minimum edge threshold signal. Else if, the edge direction is determined to be 60° if the 60° filter output selected from the set of pair-averaged filter outputs is equal to the edge minimum signal and the −30° and the −45° filter outputs selected from the set of pair-averaged filter outputs are above about the minimum edge threshold signal. Else if, the edge direction is determined to be −60° if the −600 filter output selected from the set of pair-averaged filter outputs is equal to the edge minimum signal and the 30° and the 45° filter outputs selected from the set of pair-averaged filter outputs are above about the minimum edge threshold signal. Else if, the edge direction is determined to be 90° if the 90° filter output selected from the set of pair-averaged filter outputs is equal to the edge minimum signal and the −30°, the −45°, the 30° and the 45° filter outputs selected from the set of pair-averaged filter outputs are above about the minimum edge threshold signal. Else if, no edge direction is selected if the edge direction calculation module fails to determine a valid edge direction.

Referring back to the post-detection filter array, the first filtered edge direction is determined by obtaining a two-dimensional array of edge detection values centered around a current edge detection value, determining a set of dissimilar edge detection values and a set of similar edge detection values based on the two-dimensional array of edge detection values, assigning a proximity-weighted value for each of the individual dissimilar and similar edge detection values, calculating a first sum of the proximity-weighted values of the individual dissimilar edge detection values, calculating a second sum of the proximity-weighted values of the individual similar edge detection values minus a constant and determining that a valid edge direction does not exist if the first sum is greater than about the second sum minus a predetermined threshold and the first sum is greater than about a predetermined threshold.

The second filtered edge direction is determined by obtaining the immediately left and an immediately right edge detection value relative to the current edge detection value. If the immediate left and the immediate right edge detection values are equal, the current edge detection value is set to a value equal to the immediate left and immediate right edge detection values. Finally, if the immediate left and the immediate right edge detection values are from a set of adjacent edges and the current edge detection value is not from the set of adjacent edges, the current edge detection value is set equal to the immediate left edge detection value.

The third filtered edge direction is determined by obtaining the immediately left and the immediately right edge detection value relative to the current edge detection value. If the immediate left or the immediate right edge detection values are 15° and a current edge direction value is 0° or none, the current edge direction value is set to 15°. Alternatively, if the immediate left or the immediate right edge detection values are −15° and a current edge direction value is 0° or none, the current edge direction value is set to −15°. The final edge direction is determined by removing a set of any remaining single pixel wide edge detection values.

A block diagram of the pixel calculation method of the preferred embodiment is shown in FIG. 8. Luma and chroma data 170 from the current video field and the final edge direction 136 are stored in a two dimensional storage array block 172. The storage block 172 serves to provide the two-dimensional array of pixel data needed for the direction-specific calculation of new pixels 174, as well as a one-dimensional array (horizontal only) of edge direction values which yield an indication 176 of whether the edge direction was horizontal or +/−15 degrees for each location in the array. The pixel calculation module 174 calculates in parallel a separate directional pixel calculation for each of the possible edge detection orientations.

The directional pixel calculations are further detailed in FIGS. 9A–9j. FIG. 9A illustrates the pixels used for calculation when the detected angle is 90 degrees (or vertical); a cubic curve fit is performed with the four current field pixels to calculate the new pixel. FIG. 9B illustrates the pixels used for calculation when the detected angle is zero degrees (or horizontal). There are actually a variable number of pixels used in the horizontal angle calculation, with the number of pixels actually being used depending on the edge direction detected at other pixel location to the left and right of the current pixel location. The number of pixels used is based on the number of adjacent pixel locations which have detected a horizontal angle, starting from the closest location and working outward. The more adjacent pixels which have a horizontal detected angle, the larger the number of pixels used in the calculation of the new pixel up to a maximum of the twenty pixels shown in FIG. 9B. There can be a different number of pixels used on either the left or right side depending on the edge detection values to each respective side. All the pixels used in the calculation are simply averaged. FIGS. 9C and 9D illustrate the pixels used for new pixel calculation when the detected edge angle is +/− 15 degrees. For each of these two angles, the four pixels shown are averaged to calculate the new pixel. FIGS. 9E and 9F illustrate the pixels used for new pixel calculation when the detected edge angle is +/− 30 degrees. For each of these two angles, the two pixels shown are averaged to calculate the new pixel. FIGS. 9G and 9G illustrate the pixels used for new pixel calculation when the detected edge angle is +/− 45 degrees. For each of these two angles, the two pixels shown are averaged to calculate the new pixel. FIGS. 9I and 9J illustrate the pixels used for new pixel calculation when the detected edge angle is +/− 60 degrees. For each of these two angles, a cubic curve fit is performed with the four averages of each of the illustrated pixel pairs to calculate the new pixel.

Referring back to FIG. 8, details of the pixel selection module 182 are shown within the dotted line area 184 of FIG. 8. The directional calculated pixels 180 are the inputs to a multiplexer 186 which selects one of the calculated pixels based on the edge detection direction 188 for the current pixel location. If no valid edge is detected, then the vertical direction is chosen. The selected calculated pixel is then blended by a mixing circuit 194 with a pixel 190 from the same spatial location from the previous field based on the value of a motion detection signal 192. A large degree of detected motion results in a mix weighted towards the calculated pixel while a low degree of detected motion results in a mix weighted towards the previous field pixel. The output of the mixer 194 is the final output pixel 196 of the edge-adaptive deinterlacer.

In other words, a system for an edge-based pixel calculation includes a two-dimensional pixel storage array responsive to a set of current field chroma/luma data and a final edge direction and is operative to develop a two-dimensional array of pixel data, a flat/horizontal edge direction indication and an edge direction. Also, a directional pixel calculation module is responsive to the two-dimensional array of pixel data and the flat/horizontal edge direction indication and is operative to develop a set of directional calculated pixels. Finally, a calculated pixel selection module is responsive to the set of directional calculated pixels, the edge direction, a pixel from a previous field and a motion detection signal and is operative to develop a final directional pixel.

Also, the calculated pixel selection module also includes a multiplexer responsive to the set of directional calculated pixels and the edge direction and is operative to develop a directional calculated pixel. Additionally, a mixing circuit responsive to the directional calculated pixel, the pixel from a previous field and the motion detection signal and operative to develop the final directional pixel.

In an additional embodiment of the present invention, an image feature edge detector includes a horizontal filter means is receptive to a vertically aligned luma data stream and provides a filtered luma data stream. An edge direction calculation means is receptive to the filtered luma data stream and provides an indication of an edge direction. Finally, a post-detection filter array means is receptive to the indication of the edge direction and provides a final indication of an edge direction.

It will therefore be appreciated that the edge-adaptive deinterlacer of the present invention provides for improved image quality and the reduction of deinterlacing artifacts. This is accomplished by the identification of image feature edges and the subsequent calculation of new pixel values based upon those edges.

While this invention has been described in terms of several preferred embodiments, it will be appreciated that those skilled in the art, upon reading the preceding specifications and studying the drawings, will realize various alterations, additions, permutations, and equivalents as fall within the true spirit and scope of the invention.

What is claimed is:

1. A system for the detection of image feature edges comprising:
 a) a lowpass filter responsive to a first, second, third and fourth vertically aligned luma data sample rows and operative to develop a first, second, third and fourth low pass filtered luma data samples;
 b) a two-dimensional pixel storage array responsive to the first, second, third and fourth lowpass filtered luma data samples and operative to develop a two-dimensional array of pixel data;
 c) a first horizontal halfband highpass filter receptive to the second and third lowpass filtered luma data samples and operative to develop a first horizontal highpass filtered luma data sample;
 d) a second horizontal halfband highpass filter receptive to the second and third vertically aligned luma data sample rows and operative to develop a second horizontal highpass filtered luma data sample;
 e) a luma maximum/minimum/delta calculation module receptive to the two-dimensional array of pixel data and operative to develop a minimum/maximum/delta;
 f) a directional halfband highpass filter array receptive to the two-dimensional array of pixel data and operative to develop a set of directional highpass filter outputs;
 g) a first horizontal lowpass filter receptive to the first horizontal highpass filtered luma data sample and operative to develop a first horizontal lowpass filtered luma data sample;
 h) a second horizontal lowpass filter receptive to the second horizontal highpass filtered luma data sample and operative to develop a second horizontal lowpass filtered luma data sample;
 i) an above/below filter pair output averaging module responsive to the highpass filter outputs and operative to develop a set of pair-averaged filter output magnitudes;
 j) an edge maximum/minimum calculation module responsive to the set of pair-averaged filter output magnitudes and operative to develop a too many maximums signal, a minimum-maximum/close signal, an edge minimum signal, a minimum edge threshold signal and a minimums signal;
 k) an edge direction calculation module responsive to the minimum/maximum/delta, the set of pair-averaged filter outputs, the maximums signal, the minimum-maximum/close signal, the edge minimum signal, the minimum edge threshold signal, the minimums signal, the first horizontal lowpass filtered luma data sample and the second horizontal lowpass filtered luma data sample and operative to develop an edge direction; and
 l) a post-detection filter array responsive to the edge direction and operative to develop a final edge direction.

2. The system of claim 1 wherein the post-detection filter array is comprised of:
 a) a two-dimensional statistical filter responsive to the edge direction and operative to develop a first filtered edge direction;
 b) a non-linear edge smoothing filter responsive to the first filtered edge direction and operative to develop a second filtered edge direction;
 c) a 15° angle enhancement filter responsive to the second filtered edge direction and operative to develop a third filtered edge direction; and
 d) a single-pixel edge removal filter responsive to the third filtered edge direction and operative to develop the final edge direction.

3. The system of claim 2 wherein the first filtered edge direction is determined by:
 a) obtaining a two-dimensional array of edge detection values centered around a current edge detection value;
 b) determining a set of dissimilar edge detection values and a set of similar edge detection values based on the two-dimensional array of edge detection values;
 c) assigning a proximity-weighted value for each of the individual dissimilar and similar edge detection values;
 d) calculating a first sum of the proximity-weighted values of the individual dissimilar edge detection values;
 e) calculating a second sum of the proximity-weighted values of the individual similar edge detection values minus a constant; and
 f) determining that a valid edge direction does not exist if the first sum is greater than about the second sum minus a predetermined constant value and the first sum is greater than about a predetermined threshold.

4. The system of claim 3 wherein the second filtered edge direction is determined by:
 a) obtaining the immediately left and an immediately right edge detection value relative to the current edge detection value;
 b) if the immediate left and the immediate right edge detection values are equal, the current edge detection value is set to a value equal to the immediate left and immediate right edge detection values; and
 c) if the immediate left and the immediate right edge detection values are from a set of adjacent edges and the current edge detection value is not from the set of adjacent edges, the current edge detection value is set equal to the immediate left edge detection value.

5. The system of claim 4 wherein the third filtered edge direction is determined by:
   a) obtaining the immediately left and the immediately right edge detection value relative to the current edge detection value;
   b) if the immediate left or the immediate right edge detection values are 15° and a current edge direction value is 0° or none, the current edge direction value is set to 15°; and
   c) if the immediate left or the immediate right edge detection values are −15° and a current edge direction value is 0° or none, the current edge direction value is set to −15°.

6. The system of claim 5 wherein the final edge direction is determined by removing a set of any remaining single pixel wide edge detection values.

7. The system of claim 1 wherein the edge maximum/minimum calculation module comprises:
   a) a maximum detection responsive to the set of pair-averaged filter output magnitudes and operative to develop a maximum edge value;
   b) a maximum edge threshold calculation responsive to the maximum edge value and a first threshold value and operative to develop a maximum edge threshold value;
   c) a maximums detection responsive to the set of pair-averaged filter output magnitudes and the maximum edge threshold value and operative to develop the maximums signal;
   d) a minimum detection responsive to the set of pair-averaged filter output magnitudes and operative to develop the edge minimum signal;
   e) a minimum edge threshold calculation responsive to the edge minimum signal and a second threshold value and operative to develop the minimum edge threshold signal;
   f) a minimums detection responsive to the set of pair-averaged filter output magnitudes and the minimum edge threshold signal and operative to develop the minimums signal; and
   g) a minimum/maximum close calculation module responsive to the maximum edge value, the edge minimum signal and a third threshold value and operative to develop the minimum-maximum/close signal.

8. The system of claim 1 wherein the edge direction calculation module determines the edge direction is not a valid edge if the maximums signal, the minimum-maximum/close signal or the minimums signal is received from the edge maximum/minimum calculation module.

9. The system of claim 8 wherein the edge direction calculation module determines the edge direction is not a valid edge if the edge minimum signal is greater than about a threshold value which is proportional to a luma delta component of the minimum/maximum/delta.

10. The system of claim 9 wherein the edge direction calculation module inhibits the selection of a −45°, a −30°, a −15°, a 15°, a 30° and a 45° edge direction if the first horizontal lowpass filtered luma data sample and the second horizontal lowpass filtered luma data sample are greater than about a first threshold.

11. The system of claim 10 wherein the edge direction calculation module has received no indication of a non-valid edge from the edge maximum/minimum calculation module and no more than two of the set of pair-averaged filter outputs are greater than about the minimum edge threshold signal then the edge direction is determined to be:

a) 0° if a −15° and a 15° filter output selected from the set of pair-averaged filter outputs are below about the minimum edge threshold signal; or b) 15° if a 0° and a 30° filter output selected from the set of pair-averaged filter outputs are below about the minimum edge threshold signal; or c) 15° if the 15° filter output selected from the set of pair-averaged filter outputs is below about the minimum edge threshold signal and a 90°, a −60°, a 60° and a −45° filter outputs selected from the set of pair-averaged filter outputs are above about the minimum edge threshold signal; or d) −15° if the 0° and a −30° filter output selected from the set of pair-averaged filter outputs are below about the minimum edge threshold signal; or e) −15° if the −15° filter output selected from the set of pair-averaged filter outputs is below about the minimum edge threshold signal and the 90°, the −60°, the 60° and the +45° filter outputs selected from the set of pair-averaged filter outputs are above about the minimum edge threshold signal; or f) 0° if the 0° filter output selected from the set of pair-averaged filter outputs is equal to the edge minimum signal and the 90°, the −60° and the 60° filter outputs selected from the set of pair-averaged filter outputs are above about the minimum edge threshold signal; or g) 30° if the 30° filter output selected from the set of pair-averaged filter outputs is equal to the edge minimum signal and the −30°, the −45° and the −60° filter outputs selected from the set of pair-averaged filter outputs are above about the minimum edge threshold signal; or h) −30° if the −30° filter output selected from the set of pair-averaged filter outputs is equal to the edge minimum signal and the 30°, the 45° and the 60° filter outputs selected from the set of pair-averaged filter outputs are above about the minimum edge threshold signal; or i) 45° if the 45° filter output selected from the set of pair-averaged filter outputs is equal to the edge minimum signal and the −30°, the −45° and the −60° filter outputs selected from the set of pair-averaged filter outputs are above about the minimum edge threshold signal; or j) −45° if the −45° filter output selected from the set of pair-averaged filter outputs is equal to the edge minimum signal and the 30°, the 45° and the 60° filter outputs selected from the set of pair-averaged filter outputs are above about the minimum edge threshold signal; or k) 60° if the 60° filter output selected from the set of pair-averaged filter outputs is equal to the edge minimum signal and the −30° and the −45° filter outputs selected from the set of pair-averaged filter outputs are above about the minimum edge threshold signal; or l) −60° if the −60° filter output selected from the set of pair-averaged filter outputs is equal to the edge minimum signal and the 30° and the 45° filter outputs selected from the set of pair-averaged filter outputs are above about the minimum edge threshold signal; or m) 90° if the 90° filter output selected from the set of pair-averaged filter outputs is equal to the edge mini mum signal and the −30°, the −45°, the 30° and the 45° filter outputs selected from the set of pair-averaged filter outputs are above about the minimum edge threshold signal; or n) no edge direction is selected if the edge direction calculation module fails to determine a valid edge direction.

12. The system of claim 1 wherein the lowpass filter is a horizontal lowpass filter.

13. The system of claim 1 wherein the lowpass filter is a vertical lowpass filter.

* * * * *